United States Patent [19]

Smith, Jr. et al.

[11] 4,151,400

[45] Apr. 24, 1979

[54] AUTOCLAVE FURNACE WITH MECHANICAL CIRCULATION

[75] Inventors: Charles W. Smith, Jr., Fairview; William H. Walker; Franz X. Zimmerman, both of Erie, all of Pa.

[73] Assignee: Autoclave Engineers, Inc., Erie, Pa.

[21] Appl. No.: 806,732

[22] Filed: Jun. 15, 1977

[51] Int. Cl.$^2$ .......................... B29C 3/00; B22F 3/14

[52] U.S. Cl. .................................. 219/400; 13/31 R; 425/405 H; 432/199; 432/206

[58] Field of Search ......................... 23/285, 290, 289; 432/206, 247, 199, 206, 188, 194, 195; 219/386, 387, 341, 392, 390, 398, 400, 401, 403, 314, 320, 380; 13/20, 25, 31; 266/184, 255, 263; 415/115-117; 425/405 H

[56] References Cited

U.S. PATENT DOCUMENTS

| | | | |
|---|---|---|---|
| 1,499,317 | 6/1924 | Beyer | 13/25 |
| 1,986,088 | 11/1933 | Wild | 219/400 |
| 2,249,411 | 7/1941 | Woodson | 432/206 |
| 2,294,034 | 8/1942 | Jaeger | 13/31 |
| 2,404,060 | 7/1946 | Hall et al. | 13/20 |
| 2,996,363 | 8/1961 | Ruyak | 23/285 |
| 3,139,474 | 6/1964 | Weech | 219/426 |
| 3,166,305 | 1/1965 | Troglione | 432/199 |
| 3,188,068 | 6/1965 | Schmidt | 432/206 |
| 3,419,935 | 1/1969 | Pfeiler et al. | 425/405 H |
| 3,548,062 | 12/1970 | Smith, Jr. | 13/20 |
| 3,571,850 | 3/1971 | Pohoto | 425/405 H |
| 3,603,570 | 9/1971 | Galeone | 432/206 |
| 3,832,129 | 8/1974 | Derbyshire et al. | 432/206 |

FOREIGN PATENT DOCUMENTS

| | | | |
|---|---|---|---|
| 4122161 | 12/1966 | Japan | 13/31 |
| 524016 | 7/1940 | United Kingdom | 13/20 |

*Primary Examiner*—E. A. Goldberg
*Assistant Examiner*—Bernard Roskoski
*Attorney, Agent, or Firm*—Webb, Burden, Robinson & Webb

[57] ABSTRACT

An apparatus for treating a workpiece at elevated temperatures and pressures comprising an elongate cylindrical pressure vessel. Within the pressure vessel a hearth sits upon a pedestal. A cavity near the base of the pedestal defines an impeller chamber. An impeller is positioned in the chamber and has a downwardly extending drive shaft which is magnetically driven from outside the pressure vessel.

3 Claims, 2 Drawing Figures

AUTOCLAVE FURNACE WITH MECHANICAL CIRCULATION

Figure 1:
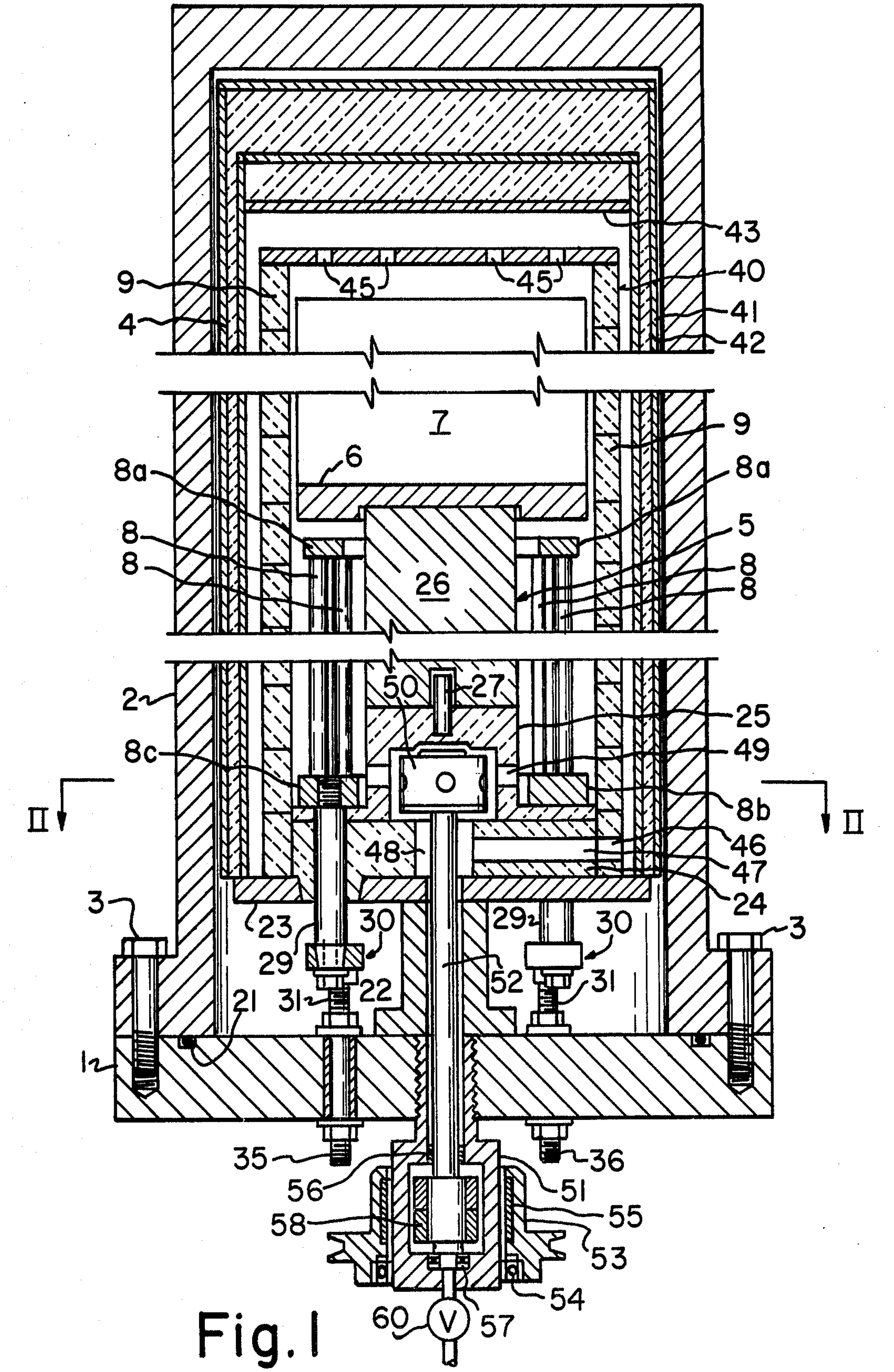

There currently exist numerous uses for apparatus that treat a specimen or workpiece at high pressures and high temperatures including, for example, gas pressure bonding furnaces and hot isostatic pressing apparatus. In these apparatus, it is typical to treat a workpiece at 1000° C. and 15,000 psi although these are not the maximum temperature and pressure conditions encountered. Suitable apparatus for these applications generally comprise a furnace within a pressure vessel or autoclave. The furnace provides the heat to the workpiece and protects the vessel from excessive temperature. The vessel maintains the furnace and the workpiece at the desired pressures.

For a given pressure, the diameter of the pressure vessel determines the minimum safe thickness of the vessel wall. To avoid extremely heavy vessels, it is desirable to reduce the vessel diameter as much as possible. Stated another way, the space between the interior of the vessel lining and the workpiece should be very small even though this is the space occupied by the furnace.

In most processes, it is essential that the temperature of the workpiece by extremely uniform. Otherwise, problems may result from differential thermal expansion of the workpiece. Thus, the furnace portion of the high pressure-high temperature apparatus must distribute that heat evenly to the workpiece.

It is an advantage of this invention to provide an autoclave or pressure vessel-furnace structure that minimizes the diameter of the pressure vessel, while at the same time providing for even distribution of heat to the workpiece in a way to obtain uniform workpiece temperature.

Briefly, according to this invention, there is provided an apparatus for gas pressure bonding, hot isostatic pressing or the like in which a workpiece may be treated at elevated temperatures and pressures. The apparatus comprises an elongate cylindrical pressure vessel. The pressure vessel further comprises an insulated hood for enclosing the workpiece and a hearth upon which the workpiece rests. The hearth is set upon a refractory pedestal and a cylindrical heating element surrounds the pedestal completely below the hearth. Preferably, the heating element is carbon or graphite. Other electrical resistance heating elements may be satisfactory including molybdenum or tungsten mesh. The heating element may be SiC for oxidizing atmospheres at lower power requirements. A cylindrical refractory shield may be disposed about the pedestal and heating element in a way to permit convection to transfer heat from the heating element to the workpiece placed upon the hearth.

A cavity near the base of the pedestal forms an impeller housing having radially extending exhaust ports opening out through the side of the pedestal. An impeller is positioned in the impeller chamber and has a downwardly extending shaft. The shaft passes through the bottom of the pressure vessel and enters a sealed drive unit where driven magnets are secured thereto. Suitable magnet drives are those disclosed, for example, in Ruyak U.S. Pat. No. 2,996,363.

Figure 2:
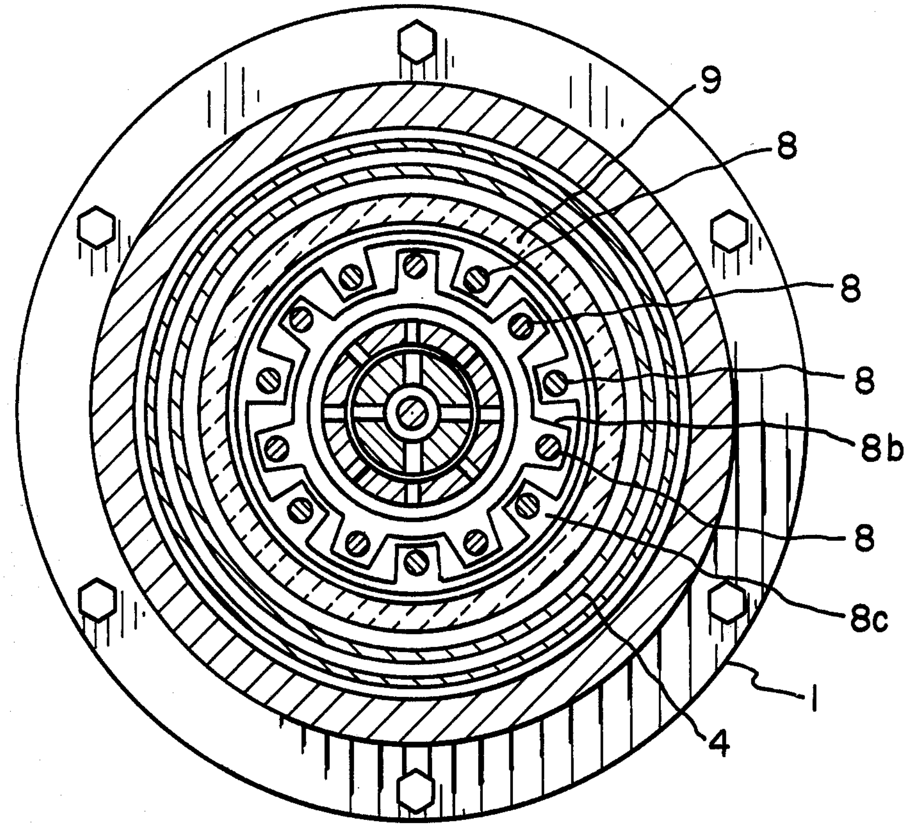

Further features and other objects and advantages of this invention will become clear from reading the following detailed description with reference to the drawings in which:

FIG. 1 is a section view through a furnace according to one embodiment of this invention, and FIG. 2 is a plan view in section corresponding to FIG. 1.

Referring to FIG. 1, there is shown a pressure vessel 1,2 arranged outside of a furnace comprising a hood 4, a shield 9, and heating elements 8. A workpiece 7 is supported upon a hearth 6 and pedestal 5.

More specifically, referring to FIG. 1 there is shown a pressure vessel or autoclave comprising a base 1 and an inverted hat-shaped shell 2. The flange at the base of the shell is provided with openings through which fastening means 3 enable the shell to be secured to the base. An O-ring or gasket 21 provides a pressure tight seal. The base or the shell is provided with openings (not shown) which are connected to means for pressurizing the interior of the vessel, for example, with an inert atmosphere. Pressures up to 30,000 psi are typical. The thickness of the shell depends upon the pressures to be contained and the diameter of the shell. Typically the shell is made from high strength steel.

According to this invention, a pedestal 5 supported from the base supports a hearth 6. The hearth should be strong enough to support the workpiece at working temperatures. The pedestal should have as low a heat capacity as possible. In this way, more of the energy introduced into the furnace is available to heat the workpiece and less is required to heat the pedestal. The hearth 6 has a diameter greater than the diameter of the pedestal. This enables the base of the workpiece 7 to be greater than the top of the pedestal 5.

Preferably, a hollow foot 22 supports a furnace bottom 23 somewhat above the base 1. The foot 22 and the furnace bottom 23 may be constructed of carbon steel. Setting upon the furnace bottom is a heat and electrical insulating support 24 which may be made from refractory insulating or high alumina castable. The support 24 sets upon pedestal 5 comprising an impeller chamber block 25 and the pedestal extension 26. A graphite, molybdenum or tungsten hearth 6 tops the pedestal extension 26. An anchor 27 fixed in the impeller chamber block engages the graphite pedestal extension to ensure alignment.

Surrounding the pedestal but not in contact therewith is a cylindrical carbon or graphite, SiC or refractory metal (e.g., molybdenum) electrical resistance heating element. The heating element may comprise a cylindrical cage of rods 8 with adjacent rods forming pairs joined at the top by caps 8*a* spanning each pair. Two conducting rings, one 8*b* with external teeth and another 8*c* with internal teeth are arranged around the pedestal to form bases to support the cylindrical rods 8 and to provide the pairs of rods with electrical current.

Electrical connecting means 35 and 36 are provided through the base of the vessel to supply an electrical current at an appropriate voltage level to the heating elements.

In a preferred embodiment, the furnace bottom 23, the insulating support 24 and impeller chamber block 25 have openings therein to permit graphite carbon, molybdenum or tungsten rods 29 threaded to the conducting rings 8*b* and 8*c* to pass into the space below the furnace bottom. Here means 30 couple the rods to the terminal 31 which is connected to an electrical conduit passing through the base 1.

A refractory shield 9 is provided about the periphery of the heating element. Its principal function is to prevent radiation directly outward from the heating element toward the hood 4.

The shield 9 may comprise an insulating refractory, say a lightweight insulating brick or refractory castable. The shield may also comprise a multi-shell radiation shield. The top and bottom of the shield must be vented. Holes 45 in the top of the shield are preferably centrally spaced. Return holes 46 are circumferentially spaced at the base of the hood. To a large extent, the general structure described above is disclosed in our copending application, Ser. No. 780,718, filed Mar. 24, 1977 entitled "High Temperature Autoclave." In that application, we explained good temperature uniformity at high temperatures could be achieved without mechanical means to induce convection currents. In this application, we describe mechanical means to induce currents which provide an added advantage, namely, rapid heating and cooling of the workpiece while maintaining temperature uniformity.

The insulation support 24 has an axial opening 48 and intake channels 47 extending radially therefrom. Channels 47 are arranged to align with the return holes 46 in shield 9. The impeller chamber block 25 has an impeller chamber with a plurality of radial exhaust ports 49 extending therefrom. An impeller 50 is positioned within the impeller chamber and is secured to a downwardly extending shaft 52. The shaft passes through the insulating support 24, the furnace bottom 23, the foot 20 and the base 1 of the pressure vessel.

The shaft 52 passes into a sealed magnetic drive unit of the type disclosed, for example in U.S. Pat. No. 2,996,363 and U.S. Pat. No. 4,106,825, assigned to the same assignee as this application. In an alternate embodiment, the shaft 52 is driven by an electric motor positioned between the base 1 and the furnace bottom 23. In this instance, the temperature of the space below the furnace bottom must be carefully maintained at a safe operating temperature for the electric motor. Also, the electric motor requires the space between the bottom and the space to be enlarged.

Whatever means are used to turn the shaft 52, they should have a variable speed control. This will enable the circulation within the vessel to be tailored to the particular process or process stage taking place within the vessel.

Secured to the pressure vessel, for example, by threads is a cylindrical drive housing 51. Surrounding the cylindrical housing 51 is a drive sleeve 53 jounaled to the housing by bearings 54. The purpose of the drive sleeve is to carry drive magnets 55 which may be cylindrical magnets of the rare earth cobalt type being circumferentially magnetized. That is, the magnets have a plurality of alternating north and south poles around the inner periphery thereof. Positioned within the housing is a driven shaft assembly, which assembly joins or is the same as the above described impeller shaft 52. The driven shaft assembly is journaled by a bushing 56 and thrust bearing 57. Secured to the driven shaft assembly are driven magnet or magnets 58 which preferably are cylindrical magnets of the rare earth cobalt types for example, sumarium cobalt, which magnets may be circumferentially magnetized. In other words, the driven magnets may have a plurality of alternating poles surrounding their outer cylindrical surface. The number of poles is equal to the number of poles in the inner cylindrical surface of the driving magnets 55 having the same uniform angular spacing.

Where the shaft 52 passes through the furnace bottom 23 it may pass through an axially aligned bushing in which the shaft is journaled. This is desirable where the length of the shaft, if not journaled when passing through the bottom 23, results in excessive vibrations. The impeller 50 may be of conventional "squirrel cage" design or any other suitable design. Since the impeller will be subject to high temperatures, it and shaft 52 must be made from materials that can withstand such temperatures.

When the impeller 50 is rotated it draws in the furnace atmosphere or gases along the impeller shaft 52 and forces the gases radially outward into the space between the pedestal wall and the shield 9 in the vicinity of the heating elements 8. The gases are heated passing by the heating elements (assuming they are heated at the time) and forced into the space above the hearth 6 where they transfer heat to the workpiece. Thereafter, the gases pass between the shield 9 and the hood 4 returning through the openings 46 in the shield and passages 47 in the insulating support 24 to the vicinity of the drive shaft 52. During cooling the gases pass the same path, the only difference being the heating elements 8 are turned off.

The insulating hood 4 is the principal heat insulation separating the workpiece and the heating element from the pressure vessel shell. The hood is designed to minimize heat transfer to the shell and to have a low heat capacity. A number of hood designs are possible. One shown in FIG. 1, comprises a stainless steel inner lining 40 and a carbon steel outer lining 41 with ceramic fiber heat insulation 42 therebetween. Other hood structures might comprise no inner sheet and refractory insulating brick in place of the fibers. An additional axial heat shield 43 may be placed at the upper end of the hood for best results. It should be a refractory metal such as Inconel. As with the pedestal, the less heat energy absorbed by the hood, the more available for raising the temperature of the workpiece. Hence, the heat capacity of the hood should be minimized.

The heating element or elements according to this invention are located completely below the workpiece and thereby do not occupy space between the workpiece 7 and the hood 4. This enables the diameter of the hood and therefore the shell to be reduced with the advantages described above.

In a preferred embodiment of this invention a valve 60 controls an opening into the magnetic drive housing 51. Through this valve, cooling and purge gases may be introduced and sample gases drawn. The shaft 52 may be hollow to provide enhanced communication between the magnetic drive housing and the impeller chamber. The hollow shaft should have radial openings near its upper end for this purpose.

The unique placement of the impeller 50 in the pedestal near the base thereof and the arrangement of the heating elements around the base, make it practical to force protective purge gases through openings 49 into the vicinity of the heating element. This then gives the user of the vessel the capability of hot loading the vessel. In otherwords, a preheated workpiece can be loaded on the pedestal while the heating elements are still relatively warm from the preceeding use of the vessel. The purge through the drive shaft, say with Argon, will assure blanketing of the heating elements, hearth and workpiece once it is set thereon.

The forced circulation of furnace atmosphere enables the placement of "getters" in the convection circuit to remove undesirable constitutents from the gases. For example, the forced atmosphere stream may be directed through a bed of titanium or zirconium chips to purify the gases before they are washed over the workpiece.

Having thus described the invention in the detail and with the particularity required by the Patent Laws, what is desired protected by Letters Patent is set forth in the following claims.

We claim:

1. An apparatus for gas pressure bonding, hot isostatic pressing or the like in which a workpiece may be treated at elevated temperatures and pressures, said apparatus comprising an elongate cylindrical pressure vessel, a furnace bottom and an insulating hood resting upon the furnace bottom for enclosing the workpiece and a hearth upon which the workpiece rests, the improvement comprising an elongate cylindrical refractory pedestal extending upward from the furnace bottom, a hearth set upon said refractory pedestal, a cylindrical heating element disposed about and substantially along the entire length of said pedestal below said hearth, a cylindrical shield disposed about the pedestal and heating element at least along the entire length of the pedestal, said pedestal having an impeller chamber adjacent the base thereof with radial exhaust ports extending therefrom and an impeller positioned in said chamber having a downwardly extending drive shaft, whereby the vessel atmosphere may be circulated around the cylindrical shield such that convection transfers heat from the heating element to the workpiece.

2. An apparatus for gas pressure bonding, hot isostatic pressing or the like in which a workpiece may be treated at elevated temperatures and pressures, said apparatus comprising an elongate cylindrical pressure vessel, a furnace bottom, an insulating hood resting upon the furnace bottom for enclosing the workpiece and a hearth upon which the workpiece rests, the improvement comprising an insulating support resting upon the furnace bottom having an axial opening and intake channels extending radially therefrom, an elongate cylindrical refractory pedestal having a base resting over the axial opening in the insulating support, said hearth set upon said refractory pedestal, a cylindrical heating element coaxial with said pedestal and resting on the insulating base and extending substantially the entire length of the pedestal up to said hearth, a cylindrical shield disposed about the pedestal and heating element upwardly from the furnace bottom at least along the entire length of the pedestal, said pedestal having an impeller chamber adjacent the base thereof and in communication with the axial opening in the insulating support with radial exhaust channels extending therefrom and an impeller positioned in said chamber having a downwardly extending drive shaft, whereby the vessel atmosphere may be circulated around the cylindrical shield such that convection transfers heat from the heating element to the workpiece.

3. An apparatus for gas pressuring bonding, hot isostatic pressing or the like in which a workpiece may be treated at elevated temperatures and pressures, said apparatus comprising an elongate cylindrical pressure vessel, an insulating hood for enclosing the workpiece and a hearth upon which the workpiece rests, the improvement comprising said hearth set upon a refractory pedestal, a cylindrical heating element being disposed about said pedestal below said hearth, a cylindrical shield disposed about the pedestal and heating element, said pedestal having an impeller chamber near the base thereof with radial exhaust ports extending therefrom and an impeller positioned in said chamber having a downwardly extending drive shaft, said drive shaft being hollow and having openings near the top and bottom, a magnetic drive attached to the base of the pressure vessel for driving said drive shaft, a valve opening into said magnetic drive enabling purge gases to be introduced to the magnetic drive and then through the drive shaft to the impeller chamber from which they are dispensed, whereby when the vessel is sealed the vessel atmosphere may be circulated around the cylindrical shield such that convection transfers heat from the heating element to the workpiece and when the pressure vessel and insulating hood are removed for hot loading the heating elements may be blanketed with protective gases.

* * * * *